United States Patent
Byun et al.

(10) Patent No.: US 9,941,549 B2
(45) Date of Patent: Apr. 10, 2018

(54) RECHARGEABLE BATTERY

(71) Applicants: Samsung SDI Co., Ltd., Yongin-si, Giheung-gu (KR); Robert Bosch GmbH, Stuttgart (DE)

(72) Inventors: Sangwon Byun, Yongin-si (KR); Chiyoung Lee, Yongin-si (KR); Minseok Koo, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 852 days.

(21) Appl. No.: 13/891,187

(22) Filed: May 9, 2013

(65) Prior Publication Data

US 2014/0205863 A1 Jul. 24, 2014

(30) Foreign Application Priority Data

Jan. 23, 2013 (KR) .................. 10-2013-0007509

(51) Int. Cl.
*H01M 10/42* (2006.01)
*H01M 2/04* (2006.01)
*H01M 2/34* (2006.01)

(52) U.S. Cl.
CPC ..... *H01M 10/4257* (2013.01); *H01M 2/0404* (2013.01); *H01M 2/345* (2013.01); *H01M 2200/103* (2013.01)

(58) Field of Classification Search
CPC ......... H01M 2200/00; H01M 2200/20; H01M 2200/101; H01M 2200/103
See application file for complete search history.

(56) References Cited

U.S. PATENT DOCUMENTS 2,875,296 A    2/1959 Enderli
3,852,697 A *  12/1974 Snider .................... H01H 37/54
                                                   337/348
(Continued)

FOREIGN PATENT DOCUMENTS

CN          1297260 A     5/2001
DE     10 2009 049 445  *  5/2011  ............... B81B 7/02
(Continued)

OTHER PUBLICATIONS

English Machine Translation of JP 11-007931 dated Jan. 12, 1999, 14 pages.

(Continued)

*Primary Examiner* — Ula C Ruddock
*Assistant Examiner* — Amanda Barrow
(74) *Attorney, Agent, or Firm* — Lewis Roca Rothgerber Christie LLP

(57) ABSTRACT

A rechargeable battery, which can improve safety by maintaining a short-circuit state when the internal pressure of the rechargeable battery exceeds a critical pressure due to overcharge (or any other reason). In one embodiment, the rechargeable battery includes an electrode assembly, a case accommodating the electrode assembly, a cap assembly sealing the case and including a cap plate, and a short-circuit member including a first short-circuit plate coupled to the cap plate and a second short-circuit plate on a surface of the first short-circuit plate facing toward the electrode assembly and coupled to the cap plate.

10 Claims, 4 Drawing Sheets

(56) References Cited

U.S. PATENT DOCUMENTS

| | | | | |
|---|---|---|---|---|
| 5,184,269 | A | * | 2/1993 | Shimada ............ H01H 81/02 337/3 |
| 5,573,860 | A | * | 11/1996 | Hirano ............... B32B 15/01 428/616 |
| 5,766,793 | A | * | 6/1998 | Kameishi ............ H01M 2/348 429/56 |
| 6,342,826 | B1 | * | 1/2002 | Quinn ............... H01H 35/343 337/13 |
| 6,525,286 | B2 | * | 2/2003 | Koguchi ........... H01H 35/2657 200/83 P |
| 6,537,693 | B1 | * | 3/2003 | Suzuki .............. H01M 2/34 29/623.4 |
| 2008/0258850 | A1 | * | 10/2008 | Claeys ............. H01H 71/2454 335/36 |
| 2010/0275904 | A1 | * | 11/2010 | Bathurst ............. F24J 2/38 126/600 |
| 2010/0279156 | A1 | * | 11/2010 | Kim ................. H01M 2/0404 429/56 |
| 2010/0323234 | A1 | * | 12/2010 | Kim ................. H01M 2/206 429/158 |
| 2011/0039136 | A1 | * | 2/2011 | Byun ............... H01M 2/0404 429/56 |
| 2011/0052949 | A1 | * | 3/2011 | Byun ............... H01M 2/043 429/61 |
| 2011/0183167 | A1 | * | 7/2011 | Moon ............... H01M 2/34 429/62 |
| 2011/0183193 | A1 | * | 7/2011 | Byun ............... H01M 2/0426 429/178 |
| 2011/0183197 | A1 | * | 7/2011 | Byun ............... H01M 2/04 429/185 |
| 2011/0300419 | A1 | * | 12/2011 | Byun ............... H01M 2/22 429/61 |
| 2011/0305929 | A1 | * | 12/2011 | Byun ............... H01M 2/345 429/61 |
| 2012/0055100 | A1 | * | 3/2012 | Yamazoe ........... B24D 18/0009 51/309 |
| 2012/0183817 | A1 | | 7/2012 | Guen et al. |
| 2012/0237802 | A1 | * | 9/2012 | Byun ............... H01M 2/043 429/53 |
| 2012/0251851 | A1 | | 10/2012 | Kim et al. |

FOREIGN PATENT DOCUMENTS

| | | |
|---|---|---|
| EP | 2 284 932 A1 | 2/2011 |
| JP | 9-106804 A | 4/1997 |
| JP | 10-326610 A | 12/1998 |
| JP | 11-007931 | 1/1999 |
| JP | 2000-182598 | 6/2000 |
| JP | 2006-228520 | 8/2006 |
| JP | 2011-018645 | 1/2011 |
| JP | 2011-054561 | 3/2011 |
| KR | 2000-0073942 | 12/2000 |
| KR | 10-2002-0021888 | 3/2002 |
| KR | 2010-0137904 | 12/2010 |
| KR | 10-1042808 B1 | 6/2011 |
| KR | 10-2011-0087843 | 8/2011 |
| KR | 2011-0087567 | 8/2011 |
| KR | 10-2012-0082590 | 7/2012 |
| KR | 2012-0104911 | 9/2012 |
| KR | 10-2012-0110825 | 10/2012 |

OTHER PUBLICATIONS

EPO Search Report dated Feb. 29, 2012, corresponding to European Patent application 11178239.7, (5 pages).

SIPO Office action dated Dec. 18, 2013, with English translation, corresponding to Chinese Patent application 201110267293.6, (10 pages).

U.S. Office action dated Sep. 20, 2013, for cross reference U.S. Appl. No. 13/187,344 (now U.S. Pat. No. 8,753,765), (16 pages).

U.S. Notice of Allowance dated Feb. 14, 2014, for cross reference U.S. Appl. No. 13/187,344 (now U.S. Pat. No. 8,753,765), (6 pages).

Patent Abstracts of Japan, and English machine translation of Japanese Patent 10-326610 dated Dec. 8, 1998, listed above, (11 pages).

Patent Abstracts of Japan, and English machine translation of Japanese Publication 2000-182598 dated Jun. 30, 2000, listed above, (23 pages).

Patent Abstracts of Japan, and English machine translation of Japanese Publication 2006-228520 dated Aug. 31, 2006, listed above, (14 pages).

* cited by examiner

RECHARGEABLE BATTERY

CROSS-REFERENCE TO RELATED APPLICATION

This application claims priority to and the benefit of Korean Patent Application No. 10-2013-0007509, filed on Jan. 23, 2013, the entire content of which is incorporated herein by reference.

NAMES OF THE PARTIES TO A JOINT RESEARCH AGREEMENT

Samsung SDI Co., Ltd. and Robert Bosch GMBH were parties to a joint research agreement.

BACKGROUND

1. Field

Embodiments of the present invention relate to a rechargeable battery.

2. Description of the Related Art

Unlike a primary battery that is incapable of being recharged, a rechargeable battery can be repeatedly charged and discharged. A low-capacity rechargeable battery having a single cell is used, for example, in small portable electronic apparatuses, such as mobile phones, and camcorders. A large-capacity rechargeable battery that includes a plurality of rechargeable cells connected in a pack shape is used, for example, as a power source for driving a motor of a hybrid electric vehicle and the like.

Rechargeable batteries are manufactured in various shapes, for example, a cylindrical shape and a prismatic shape. A rechargeable battery is typically constructed with an electrode assembly in which a positive electrode and a negative electrode with a separator interposed between the positive and negative electrodes, a case accommodating the electrode assembly, and a cap assembly having an electrode terminal in the case.

Meanwhile, the rechargeable battery may be subjected to ignition and/or explosion due to an increase in the internal pressure of the rechargeable battery when excessive heat is generated due to overcharge and/or when an electrolyte is decomposed. Accordingly, there is a need for a rechargeable battery constructed to have improved safety.

SUMMARY

Embodiments of the present invention provide a rechargeable battery, which can improve safety by maintaining a short-circuit (or shorted) state when an internal pressure exceeds a preselected (or critical) pressure due to overcharge (or any other reason).

According to an embodiment of the present invention, a rechargeable battery is provided, including an electrode assembly, a case accommodating the electrode assembly, a cap assembly sealing the case and including a cap plate, and a short-circuit member including a first short-circuit plate coupled to the cap plate and a second short-circuit plate on a surface of the first short-circuit plate facing toward the electrode assembly and coupled to the cap plate.

The first short-circuit plate and the second short-circuit plate may overlap each other.

The cap plate may have a short-circuit hole, and the first short-circuit plate and the second short-circuit plate may be in the short-circuit hole.

The first short-circuit plate may include (e.g., may be made of) a material having a lower melting point than a material of the second short-circuit plate.

The first short-circuit plate may include (e.g., may be made of) aluminum.

The second short-circuit plate may include (e.g., may be made of) nickel.

The first and second short-circuit plates may be clad metals, and the second short-circuit plate may include (e.g., may be made of) a metal different from a metal of the first short-circuit plate.

Each of the first short-circuit plate and the second short-circuit plate may include a round portion protruding toward the electrode assembly, and an edge portion coupled to the cap plate.

The rechargeable battery may further include a connecting plate on the cap plate, the connecting plate being spaced from the cap plate and covering the short-circuit hole.

The connecting plate may have a hole at a location corresponding to the short-circuit hole, and the connecting plate may have a protrusion portion protruding from the exterior of the hole toward the first short-circuit plate and the second short-circuit plate.

Each of the first short-circuit plate and the second short-circuit plate may be configured to have a round portion protruding toward the connecting plate and may make contact with the protrusion portion when the internal pressure of the rechargeable battery reaches a preselected (or critical) value.

A first insulation member may be between the cap plate and the connecting plate.

The first short-circuit plate may include a fastening groove, and the second short-circuit plate may include a fastening portion fastened to the fastening groove.

A peripheral region of the first short-circuit plate and a peripheral region of the second short-circuit plate may be welded to each other.

According to another embodiment of the present invention, a rechargeable battery is provided, including an electrode assembly; a case accommodating the electrode assembly; a cap assembly sealing the case and including a cap plate; and a short-circuit member coupled to the cap plate and including a first short-circuit plate, a second short-circuit plate and a third short-circuit plate overlapping and sequentially on one another in a direction toward the electrode assembly and coupled to the cap plate.

The first short-circuit plate include (e.g., may be made of) a material having a lower melting point than a material of the second short-circuit plate.

In addition, the first short-circuit plate and the third short-circuit plate may each include (e.g., may each be made of) aluminum.

The second short-circuit plate may include (e.g., may be made of) nickel.

The first, second and third short-circuit plates may be clad metals, and the second short-circuit plate may include (e.g., may be made of) a metal different from a metal of the first and/or third short-circuit plates.

The cap plate may have a short-circuit hole, and the rechargeable battery may further include a connecting plate on the cap plate, the connecting plate being spaced from the cap plate and covering the short-circuit hole.

Each of the first short-circuit plate, the second short-circuit plate and the third short-circuit plate may be configured to protrude protrude toward the connecting plate when the internal pressure of the rechargeable battery reaches a preselected (or critical) value.

As described above, since the rechargeable battery according to the embodiment of the present invention includes a first short-circuit plate and a second short-circuit plate as clad metals, a metal of the first short-circuit plate being different from a metal of the second short circuit plate, a short circuit caused when the first short-circuit plate and the connecting plate make contact with each other can be maintained even if the first short-circuit plate is melted due to heat generated by the short circuit.

Therefore, when the internal pressure of the rechargeable battery exceeds a preselected (or critical) pressure due to overcharge (or any other reason), the short circuit can be maintained to allow a fuse portion to continuously perform a fuse function, thereby improving the safety.

Additional aspects and/or advantages of the invention will be set forth in part in the description which follows and, in part, will be apparent from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
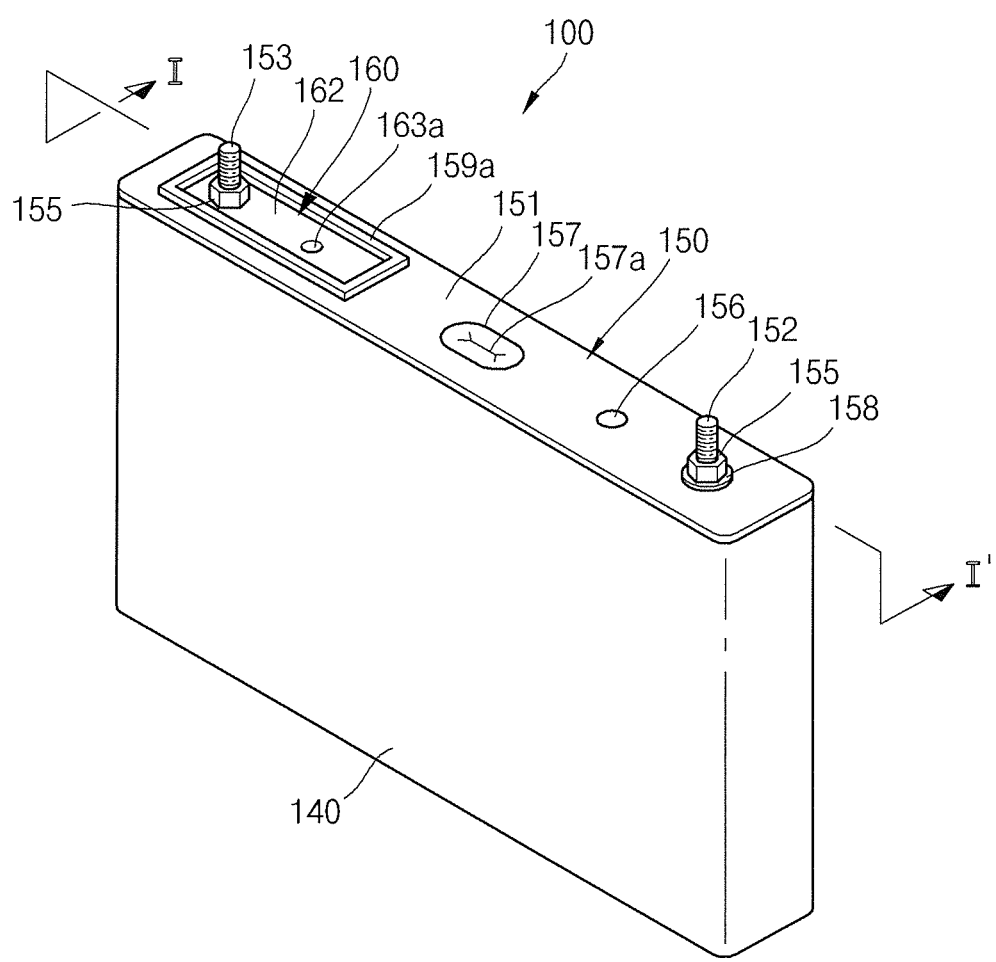
FIG. 1 is a perspective view of a rechargeable battery according to an embodiment of the present invention.

The present invention is described more fully hereinafter with reference to the accompanying drawings, in which embodiments of the present invention are shown and described, by way of illustration. These embodiments are provided so that this disclosure is thorough and will fully convey the scope of the invention to those skilled in the art. The present invention may, however, be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

Figure 2:
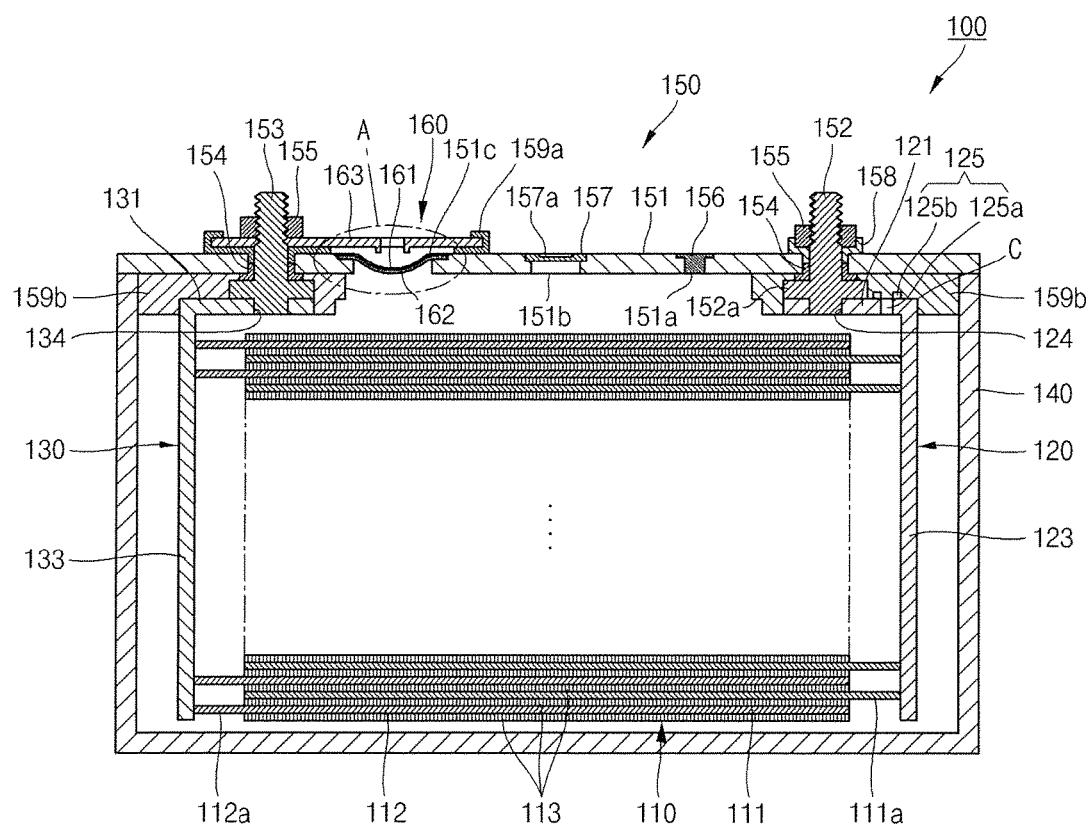
FIG. 2 is a cross-sectional view of the rechargeable battery of FIG. 1 taken along the line I-I'.
Figure 3A:
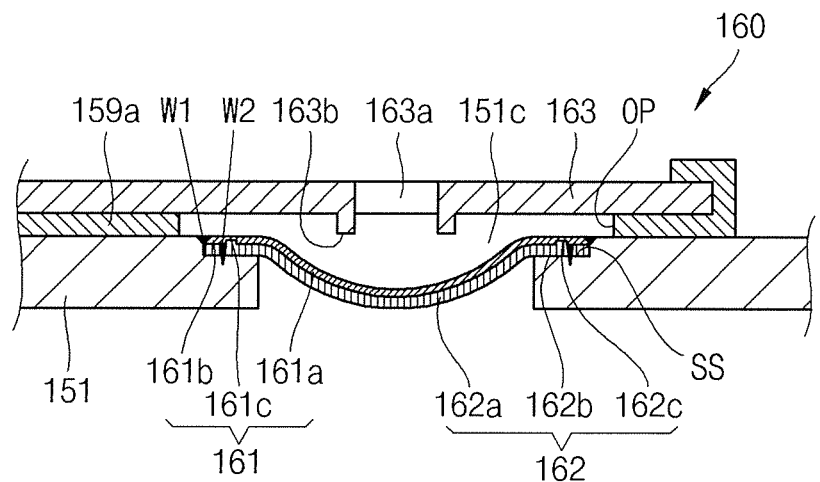
FIG. 3A is an enlarged cross-sectional view illustrating a portion 'A' of FIG. 2.
Figure 3B:
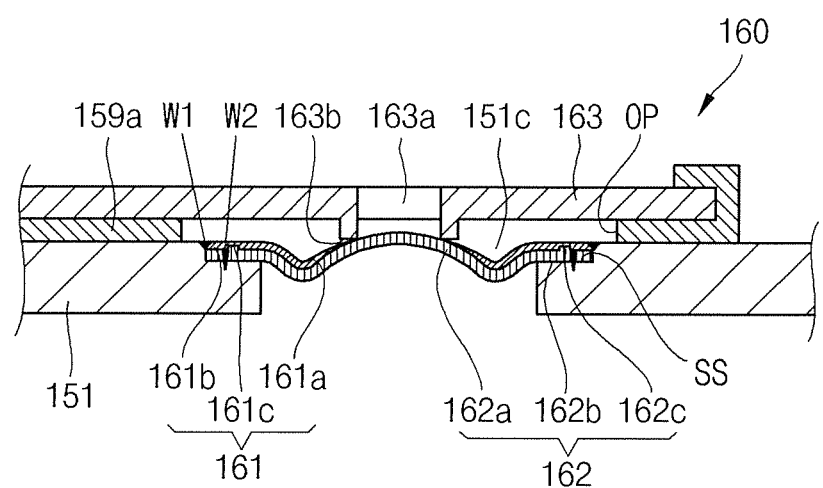
FIG. 3B is a cross-sectional view illustrating a state in which a first short-circuit plate shown in FIG. 3A makes contact with a connecting plate.

FIG. 1 is a perspective view of a rechargeable battery according to an embodiment of the present invention, FIG. 2 is a cross-sectional view of the rechargeable battery taken along the line I-I' of FIG. 1, FIG. 3A is an enlarged cross-sectional view illustrating a portion 'A' of FIG. 2, and FIG. 3B is a cross-sectional view illustrating a state in which a first short-circuit plate shown in FIG. 3A makes contact with a connecting plate.

Referring to FIGS. 1 and 2, the rechargeable battery 100 according to an embodiment of the present invention includes an electrode assembly 110, a first current collector plate 120, a second current collector plate 130, a case 140, a cap assembly 150 and a short-circuit member 160.

The electrode assembly 110 may be formed by winding or laminating a stack of a first electrode plate 111, a separator 113, and a second electrode plate 112. Here, the first electrode plate 111 may be a positive electrode and the second electrode plate 112 may be a negative electrode.

The first electrode plate 111 is formed by coating a first electrode active material, such as a transition metal oxide, on a first electrode current collector including or formed of a metal foil, such as aluminum. The first electrode plate 111 includes a first electrode uncoated portion 111a (e.g., a portion of the first electrode plate 111 having no, or substantially no, first electrode active material coated thereon). The first electrode uncoated portion 111a is (or becomes) a path for the flow of electric current between the first electrode plate 111 and the outside of the first electrode plate 111. However, aspects of the present invention are not limited to the materials of the first electrode plate 111 disclosed herein.

The second electrode plate 112 is formed by coating a second electrode active material, such as graphite or carbon, on a second electrode current collector including (e.g., formed of) a metal foil, such as nickel or copper foil. The second electrode plate 112 includes a second electrode uncoated portion 112a (e.g., a portion of the second electrode plate 112 having no, or substantially no, second electrode active material coated thereon). The second electrode uncoated portion 112a is (or becomes) a path for the flow of current between the second electrode plate 112 and the outside of the second electrode plate 112. However, aspects of the present invention are not limited to the materials of the second electrode plate 112 disclosed herein.

Here, polarities of the first electrode plate 111 and the second electrode plate 112 may be reversed (e.g., the first electrode plate 111 may be a negative electrode and the second electrode plate 112 may be a positive electrode).

The separator 113 is positioned between the first electrode plate 111 and the second electrode plate 112 to prevent (or reduce the likelihood of) an electric short circuit therebetween and to allow lithium ions to move therebetween. The separator 113 may include (e.g., may be made of) polyethylene, polypropylene or a composite film thereof. However, aspects of the present invention are not limited to the materials of the separator 113 disclosed herein.

A first current collector plate 120 and a second current collector plate 130 to be electrically coupled to the first electrode plate 111 and the second electrode plate 112, respectively, are coupled to both ends of the electrode assembly 110.

The first current collector plate 120 includes (e.g., is made of) a conductive material, such as aluminum or the like, and makes contact with the first electrode uncoated portion 111a, which protrudes to one end of the electrode assembly 110, to electrically couple the first current collector plate 120 to the first electrode plate 111. Referring to FIG. 2, the first current collector plate 120 may include a first connection portion 121, a first extension portion 123, a first terminal hole 124 and a first fuse portion 125.

The first connection portion 121 is between (e.g., installed between) an upper portion of the electrode assembly 110 and a lower portion of the cap assembly 150 and is shaped as a plate.

The first extension portion 123 is bent and extends from an end of the first connection portion 121 and is shaped as a plate substantially contacting the first electrode uncoated portion 111a. Here, a corner at which the first connection portion 121 and the first extension portion 123 meet is denoted by reference numeral 'C', and the first connection portion 121 and the first extension portion 123 are perpendicular to each other at the corner C.

The first terminal hole 124 is at (e.g., formed at) one side of the first connection portion 121 and provides a space in which a first electrode terminal 152 of the cap assembly 150 is fitted and coupled to the first terminal hole 124. Here, the first terminal hole 124 is positioned to be spaced far from the corner C of the first connection portion 121.

The first fuse portion 125 is at (e.g., formed at) an upper region of the electrode assembly 110, for example, on the first connection portion 121, so as not to make contact with an electrolyte. In addition, the first fuse portion 125 is positioned at an area of the first connection portion 121 adjacent to the corner C, so as not to overlap with the first electrode terminal 152, which is coupled to the first terminal hole 124. In more detail, the first fuse portion 125 has a first fuse hole 125a and a first reinforcement protrusion 125b protruding from around the first fuse hole 125a. The first fuse hole 125a functions as a fuse that cuts off the flow of electric current by melting a region around the first fuse hole 125a by heat generated when a large amount of current flows through the rechargeable battery 110 due to a short circuit. The first reinforcement protrusion 125b reinforces the strength of the region of the first fuse hole 125a against external shocks before the short circuit occurs to the rechargeable battery 100.

The second current collector plate 130 includes (e.g., is made of) a conductive material, such as nickel, or the like, and makes contact with the second electrode uncoated portion 112a, which protrudes to the other end of the electrode assembly 110, to electrically couple the second current collector plate 130 to the second electrode plate 112. The second current collector plate 130 includes a second connection portion 131, a second extension portion 133 and a second terminal hole 134.

In the second current collector plate 130, the second connection portion 131, the second extension portion 133 and the second terminal hole 134 have the same (or substantially the same) shapes and functions as those of the first connection portion 121, the first extension portion 123 and the first terminal hole 124 of the first current collector plate 120, respectively, which are shown in FIG. 2, and repeated explanations thereof will be omitted here.

The case 140 includes (e.g., is made of) a conductive metal, such as aluminum, an aluminum alloy, or nickel plated steel, and has a substantially rectangular parallelepiped prismatic shape having an opening for receiving the electrode assembly 110, the first current collector plate 120 and the second current collector plate 130. In FIG. 2 the case 140 and the cap assembly 150 are coupled to each other at a substantially opened portion at the periphery of the cap assembly 150. Meanwhile, the internal surface of the case 140 is insulated from the electrode assembly 110, the first current collector plate 120, the second current collector plate 130 and the cap assembly 150. Here, the case 140 may have a polarity, for example, a positive polarity.

The cap assembly 150 is coupled to the case 140. In more detail, the cap assembly 150 may include the cap plate 151, the first electrode terminal 152, the second electrode terminal 153, a gasket 154, and a nut 155. In addition, the cap assembly 150 may include a plug 156, a vent plate 157, a connecting plate 158, an upper insulation member (a first insulation member) 159a and a lower insulation member 159b.

The cap plate 151 seals the opening of the case 140 and may include (e.g., may be made of) the same (or substantially the same) material as the case 140. The cap plate 151 may have an electrolyte injection hole 151a, a vent hole 151b and a short-circuit hole 151c. Here, a side surface of the short-circuit hole 151c may have the shape of a staircase having a stepped surface SS (as shown in FIGS. 3A and 3B), and the first short-circuit plate 161 and the second short-circuit plate 162 extend over the stepped surface SS. The cap plate 151 may have the same polarity as the case 140.

Referring to FIG. 2, the first electrode terminal 152 passes through one side of the cap plate 151 and is electrically coupled to the first current collector plate 120. The first electrode terminal 152 may have the shape of a pillar, and the outer circumference of an upper pillar of the first electrode terminal 152 exposed to an upper side of the cap plate 151 is screw-fastened. A flange 152a is at a lower pillar of the first electrode terminal 152 positioned under the cap plate 151 to prevent (or reduce the likelihood of) the first electrode terminal 152 from being dislodged from the cap plate 151. A portion of the lower pillar of the first electrode terminal 152 positioned under the flange 152a is fitted into the first terminal hole 124 of the first current collector plate 120. Here, the first electrode terminal 152 may be electrically coupled to the cap plate 151.

The second electrode terminal 153 passes through the other side of the cap plate 151 (e.g., the side of the cap plate 151 other than the side at which the first electrode terminal 152 is positioned) and is electrically coupled to the second current collector plate 130. Since the second electrode terminal 153 has the same (or substantially the same) shape as the first electrode terminal 152, a repeated explanation thereof will be omitted here. The second electrode terminal 153 is insulated from the cap plate 151.

The gasket 154 includes (e.g., is made of) an insulating material and is positioned between the cap plate 151 and each of the first electrode terminal 152 and the second electrode terminal 153. The gasket 154 seals a space between the cap plate 151 and each of the first electrode terminal 152 and the second electrode terminal 153. The gasket 154 prevents or substantially prevents external moisture from permeating into the inside of the rechargeable battery 100 and prevents or substantially prevents an electrolyte contained in the rechargeable battery 100 from flowing out (e.g., leaking out of the rechargeable battery 100).

The nut 155 is engaged with the thread at each of the first electrode terminal 152 and the second electrode terminal 153 to fix the first electrode terminal 152 and the second electrode terminal 153 to the cap plate 151, respectively. The plug 156 seals an electrolyte injection hole 151a of the cap plate 151, and the vent plate 157 is installed in the vent hole 151b of the cap plate 151 and has a notch 157a configured to be opened at a preselected (or critical) pressure.

The connecting plate 158 is between the first electrode terminal 152 and the cap plate 151 and allows the first electrode terminal 152 to be fitted thereto. The connecting plate 158 makes close contact with the cap plate 151 and the gasket 154 through the nut 155. The connecting plate 158 electrically couples the first electrode terminal 152 to the cap plate 151.

The upper insulation member 159a is between the second electrode terminal 153 and the cap plate 151 and allows the second electrode terminal 153 to be fitted thereto. The upper insulation member 159a makes close contact with the cap plate 151 and the gasket 154. The upper insulation member 159a insulates the second electrode terminal 153 from the cap plate 151. Here, the upper insulation member 159a has a hole or an opening (OP), as shown in FIGS. 3A and 3B, which is aligned with the first short-circuit plate 161 and the second short-circuit plate 162.

The lower insulation member 159b is between the cap plate 151 and each of the first current collector plate 120 and the second current collector plate 130, and prevents (or reduces the likelihood of) an unnecessary short-circuit.

The short-circuit member 160 is on the cap assembly 150, and induces a short-circuit when the internal pressure of the rechargeable battery 100 exceeds a preselected (or critical) pressure due to overcharge (or any other reason), thereby allowing the first fuse portion 125 to prevent (or reduce) the flow of electric current through first fuse portion 125. To this end, the short-circuit member 160 includes a first short-circuit plate 161, a second short-circuit plate 162 and a connecting plate 163 including (e.g., made of) a conductive material.

Referring to FIG. 3A, the first short-circuit plate 161 is installed in the short-circuit hole 151c of the cap plate 151 by, for example, welding. In more detail, the first short-circuit plate 161 includes a first round portion 161a (located toward the inside of the case 140, that is, located toward the electrode assembly 110) that is downwardly convex, a first edge portion 161b fixed to a side surface of the short-circuit hole 151c (e.g., the stepped surface SS), and a coupling groove 161c on a bottom surface of the first edge portion 161b. The first short-circuit plate 161 is electrically coupled to the cap plate 151. Here, in the first edge portion 161b of the first short-circuit plate 161, a welding portion W1 may be formed at the outside of the coupling groove 161c by welding. In addition, the first short-circuit plate 161 may include (e.g., may be made of) aluminum, but aspects of the present invention are not limited thereto.

As shown in FIG. 3B, when the internal pressure of the rechargeable battery 100 exceeds a preselected (or critical) pressure due to overcharge (or any other reason), the first short-circuit plate 161 is inverted to protrude to be upwardly convex and makes contact with the connecting plate 163, thereby inducing a short-circuit. For example, the first short-circuit plate 161 protrudes toward the outside of the case 140 away from the electrode assembly 110. If a short-circuit is induced, a large amount of current may flow, generating heat. Here, the first fuse portion 125 functions as a fuse, thereby improving the safety of the rechargeable battery 100. The first short-circuit plate 161 and the connecting plate 163 may make line contact or surface contact with each other. For example, the connecting plate 163 is designed to (e.g., is configured to) make line or surface contact with the first short-circuit plate 161 at its end, thereby reducing resistance when the first short-circuit plate 161 and the connecting plate 163 contact each other. Therefore, it is possible to suppress the first short-circuit plate 161 from being melted at a contact region between the first short-circuit plate 161 and the connecting plate 163.

The second short-circuit plate 162 is installed in the short-circuit hole 151c of the cap plate 151 by, for example, welding. In more detail, the second short-circuit plate 162 is under the first short-circuit plate 161. The second short-circuit plate 162 is sized substantially corresponding to the first short-circuit plate 161 and overlaps the first short-circuit plate 161. In more detail, the second short-circuit plate 162 has a second round portion 162a (located toward the inside of the case 140, that is, located toward the electrode assembly 110) that is downwardly convex, a second edge portion 162b fixed to a side surface of the short-circuit hole 151c (e.g., the stepped surface SS), and a coupling protrusion 162c on a top surface of the second edge portion 162b. The second short-circuit plate 162 is electrically coupled to the cap plate 151. Here, in the second edge portion 162b of the second short-circuit plate 162, a welding portion W2 may be formed at the outside of the coupling protrusion 162c by welding. In addition, the second short-circuit plate 162 may include (e.g., may be made of) a material having a higher melting point than a material of the first short-circuit plate 161. For example, the second short-circuit plate 162 may include (e.g., may be made of) nickel, but aspects of the present invention are not limited thereto. In addition, the second short-circuit plate 162 and the first short circuit plate 161 may be (e.g., may be made of) clad metals, and a metal of the first short circuit plate 161 may be different from a metal of the second short-circuit plate 162. A top surface of the second short-circuit plate 162a makes contact with a bottom surface of the first round portion 161a, a top surface of the second edge portion 162b makes contact with a bottom surface of the first edge portion 161b, and a bottom surface of the second edge portion 162b makes contact with the stepped surface SS, thereby engaging the coupling protrusion 162c with the coupling groove 161c.

As shown in FIG. 3B, when the internal pressure of the rechargeable battery 100 exceeds a preselected (or critical) pressure due to overcharge (or any other reason), the second short-circuit plate 162 is inverted together with the first short-circuit plate 161 to protrude to be upwardly convex. If the first short-circuit plate 161 is melted in a state in which it makes contact with the connecting plate 163, the second short-circuit plate 162, which is positioned under the first short-circuit plate 161 and has a higher melting point than first short-circuit plate 161, makes contact with the connecting plate 163, thereby inducing a short-circuit. For example, even if the first short-circuit plate 161 induces a short-circuit due to contact with the connecting plate 163 and is melted due to heat, the second short-circuit plate 162 will continuously maintain the short-circuit state, thereby allowing the first fuse portion 125 to continue performing a fuse function.

Referring back to FIG. 2, the connecting plate 163 allows the second electrode terminal 153 to be fitted thereto from the outside thereof and be spaced apart from the cap plate 151. The connecting plate 163 extends to cover the short-circuit hole 151c. The connecting plate 163 is electrically coupled to the second electrode terminal 153. The connecting plate 163 has a planar top surface and a bottom surface, and includes (e.g., is made of) copper, but aspects of the present invention are not limited thereto. In addition, the connecting plate 163 may have a thickness of 1 mm or greater, but aspects of the present invention are not limited thereto. In addition, the connecting plate 163 may have a hole 163a at a region corresponding to the short-circuit hole 151c, and a protrusion portion 163b.

The hole 163a allows current to flow constantly when a short-circuit occurs due to contact between the first short-circuit plate 161 or the second short-circuit plate 162 and the connecting plate 163. For example, since the hole 163a has large resistance at a contact region between the first short-circuit plate 161 or the second short-circuit plate 162 and the connecting plate 163, a difference between the resistance at the contact region between the first short-circuit plate 161 or the second short-circuit plate 162 and the connecting plate 163 and the resistance at a region other than the contact region can be reduced or minimized.

The protrusion portion 163b is on the bottom surface of the connecting plate 163, for example, a surface facing the first short-circuit plate 161 and protrudes around the hole 163a. The protrusion portion 163b reduces a distance between the first short-circuit plate 161 or the second short-circuit plate 162 and the connecting plate 163, thereby allowing the first short-circuit plate 161 or the second short-circuit plate 162 to make tight contact with the connecting plate 163.

As described above, the rechargeable battery 100 according to an embodiment of the present invention includes the first short-circuit plate 161 and the second short-circuit plate 162 as clad metals, a metal of the second short circuit plate 162 being different from a metal of the first short-circuit plate 161. Therefore, even if a short circuit occurs due to contact between the first short-circuit plate 161 and the connecting plate 163, and the first short-circuit plate 161 is melted due to heat, a short circuit state can be maintained as a result of the second short-circuit plate 162 and the connecting plate 163 contacting each other.

Therefore, when the internal pressure of the rechargeable battery 100 exceeds a preselected (or critical) pressure due to overcharge (or any other reason), the rechargeable battery 100 continuously maintains a short-circuit state, thereby allowing the first fuse portion 125 to continue performing a fuse function, ultimately improving the safety of the rechargeable battery 100.

Next, a rechargeable battery according to another embodiment of the present invention will be described.

Figure 4A:
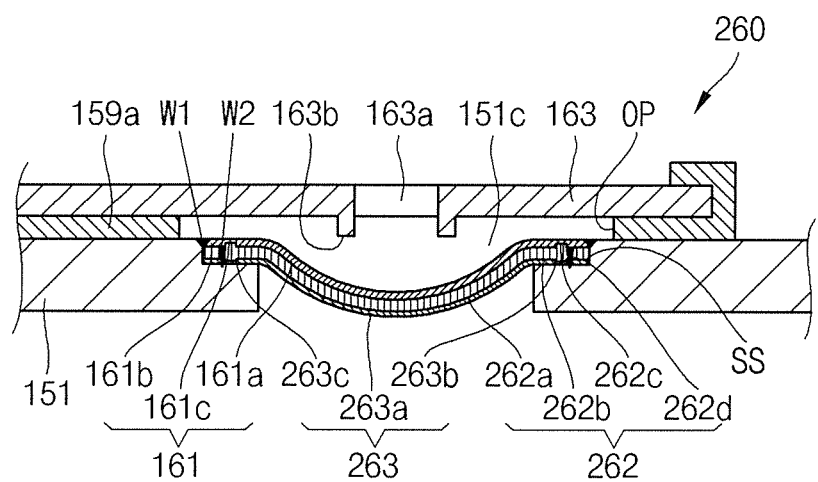
FIG. 4A is an enlarged cross-sectional view illustrating a portion of a rechargeable battery according to another embodiment of the present invention, corresponding to the portion 'A' of FIG. 2.
Figure 4B:
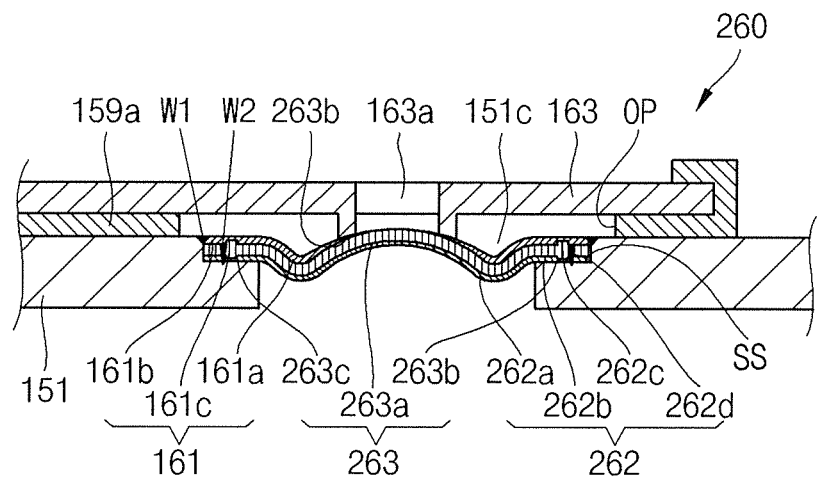
FIG. 4B is a cross-sectional view illustrating a state in which a first short-circuit plate shown in FIG. 4A makes contact with a connecting plate.

FIG. 4A is an enlarged cross-sectional view illustrating a portion of a rechargeable battery according to another embodiment of the present invention, corresponding to the portion 'A' of FIG. 2, and FIG. 4B is a cross-sectional view illustrating a state in which a first short-circuit plate shown in FIG. 4A makes contact with a connecting plate.

The rechargeable battery according to the embodiment of the present invention shown in FIGS. 4A and 4B has substantially the same (or substantially the same) configuration and functions as those of the rechargeable battery 100 shown in FIG. 2, except for a configuration of a short-circuit member 260. Thus, repeated explanations thereof will be omitted here, and the following description will focus more on the short-circuit member 260.

Referring to FIG. 4A, in the rechargeable battery according to another embodiment of the present invention, the short-circuit member 260 includes a first short-circuit plate 161, a second short-circuit plate 262 and a connecting plate 163 including (e.g., made of) a conductive material.

The first short-circuit plate 161 has substantially the same (or substantially the same) configuration and functions as those of the first short-circuit plate 161 of the rechargeable battery 100 shown in FIG. 2. Thus, repeated explanations thereof will be omitted here.

The second short-circuit plate 262 is sized to be substantially corresponding to the first short-circuit plate 161 and overlaps the first short-circuit plate 161. In more detail, the second short-circuit plate 262 has a second round portion 262a (located toward the inside of the case 140, that is, located toward the electrode assembly 110) that is downwardly convex, a second edge portion 262b fixed to a side surface of the short-circuit hole 151c (e.g., the stepped surface SS), a first coupling protrusion 262c on a top surface of the second edge portion 262b, and a second coupling protrusion 262d on a bottom surface of the second edge portion 262b. The second short-circuit plate 262 is electrically coupled to the cap plate 151. Here, in the second edge portion 262b of the second short-circuit plate 262, a welding portion W2 may be formed at the outside of each of the first and second coupling protrusions 262c and 262d by welding. In addition, the second short-circuit plate 262 may include (e.g., may be made of) a material having a lower melting point than a material of the first short-circuit plate 161. For example, the second short-circuit plate 262 may include (e.g., may be made of) nickel, but aspects of the present invention are not limited thereto. A top surface of the second short-circuit plate 262a makes contact with a bottom surface of the first round portion 161a, a top surface of the second edge portion 262b makes contact with a bottom surface of the first edge portion 161b, and a bottom surface of the second edge portion 262b makes contact with a top surface of the third edge portion 263b, and the first coupling protrusion 262c and the second coupling protrusion 262d are engaged with the coupling groove 161c and a hooking groove 263c.

A third short-circuit plate 263 is installed in the short-circuit hole 151c of the cap plate 151 by, for example, welding. In more detail, the third short-circuit plate 263 is under the second short-circuit plate 262. The third short-circuit plate 263 is sized to be substantially corresponding to the second short-circuit plate 262 and overlaps the second short-circuit plate 262. In more detail, the third short-circuit plate 263 has a third round portion 263a (located toward the inside of the case 140, that is, located toward the electrode assembly 110) that is downwardly convex, a third edge portion 263b fixed to a side surface of the short-circuit hole 151c (e.g., the stepped surface SS), and a hooking groove 263c on a top surface of the third edge portion 263b. The third short-circuit plate 263 is electrically coupled to the cap plate 151. In addition, the third short-circuit plate 263 may include (e.g., may be made of) a material having a lower melting point than a material of the second short-circuit plate 262. For example, the third short-circuit plate 263 may include (e.g., may be made of) aluminum, but aspects of the present invention are not limited thereto. In other words, the third short-circuit plate 263 may include (e.g., may be made of) the same (or substantially the same) material as the first short-circuit plate 161. In addition, the first short-circuit plate 161, the second short-circuit plate 262, and the third short-circuit plate 263 may be clad metals, and a metal of the third short-circuit plate 263 may be the same as or different from a metal of the first short-circuit plate 161, and the second short-circuit plate 262 may include (e.g., may be made of) a metal different from the metal of the first short-circuit plate 161 and/or the metal of the third short-circuit plate 263. A top surface of the third short-circuit plate 263a makes contact with a bottom surface of the second round portion 262a, a top surface of the third edge portion 263b makes contact with a bottom surface of the second edge portion 262b, and a bottom surface of the third edge portion 263b makes contact with the stepped surface SS, thereby engaging the hooking groove 263c with the coupling protrusion 262d.

As shown in FIG. 4B, when the internal pressure of the rechargeable battery 100 exceeds a preselected (or critical) pressure due to overcharge (or any other reason), the second short-circuit plate 262 is inverted together with the first short-circuit plate 161 to protrude to be upwardly convex. If the first short-circuit plate 161 is melted in a state in which it makes contact with the connecting plate 163, the second short-circuit plate 262, which is positioned under the first short-circuit plate 161 and has a higher melting point than first short-circuit plate 161, makes contact with the connecting plate 163, and the third short-circuit plate 263 continuously maintains a short-circuit state by supporting the second short-circuit plate 262. For example, even if the first short-circuit plate 161 induces a short-circuit due to contact with the connecting plate 163 and is melted due to heat, the third short-circuit plate 263 will continuously maintain the short-circuit state, thereby allowing the first fuse portion 125 to continue performing a fuse function.

As described above, the rechargeable battery according to the embodiment of the present invention includes the first short-circuit plate 161, the second short-circuit plate 262, and the third short-circuit plate 263 as clad metals, the metal of the third short-circuit plate 263 being the same as or different from the metal of the first short-circuit plate 161, and the metal of the second short-circuit plate 262 being different from the metal of the first short-circuit plate 161 and/or the metal of the second short-circuit plate 262. Therefore, even if the first short-circuit plate 161 is melted due to heat, a short circuit state can be easily maintained by contacting the second short-circuit plate 262 or the third short-circuit plate 263 to the connecting plate 163.

Therefore, when the internal pressure of the rechargeable battery exceeds a preselected (or critical) pressure due to overcharge (or any other reason), the rechargeable battery continuously maintains a short-circuit state, thereby allowing the first fuse portion 125 to continue performing a fuse function, ultimately improving the safety of the rechargeable battery.

While the rechargeable battery of the invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims, and equivalents thereof.

What is claimed is:

1. A rechargeable battery comprising:
an electrode assembly;
a case accommodating the electrode assembly;
a cap assembly sealing the case and comprising a cap plate; and
a short-circuit member comprising a first short-circuit plate coupled to the cap plate and a second short-circuit plate on a surface of the first short-circuit plate facing toward the electrode assembly and coupled to the cap plate,
wherein the first and second short-circuit plates are clad metals,
wherein the first short-circuit plate consists of aluminum and the second short-circuit plate consists of nickel,
wherein the first short-circuit plate comprises an edge portion and a coupling groove at the edge portion,
wherein the second short-circuit plate comprises a coupling protrusion protruding toward and coupled to the coupling groove, and
wherein the short-circuit member is configured to induce a short-circuit by inverting each of the second short-circuit plate and the first short-circuit plate together to be upwardly convex, the coupling protrusion remaining coupled to the coupling groove.

2. The rechargeable battery of claim 1, wherein the first short-circuit plate and the second short-circuit plate overlap each other.

3. The rechargeable battery of claim 2, wherein the cap plate has a short-circuit hole, and the first short-circuit plate and the second short-circuit plate are in the short-circuit hole.

4. The rechargeable battery of claim 2, wherein each of the first short-circuit plate and the second short-circuit plate comprises a round portion protruding toward the electrode assembly,
wherein the edge portion of the first short-circuit plate is coupled to the cap plate, and
wherein the second short-circuit plate comprises an edge portion coupled to the cap plate.

5. The rechargeable battery of claim 4, further comprising a connecting plate on the cap plate, the connecting plate being spaced from the cap plate and covering a short-circuit hole in the cap plate.

6. The rechargeable battery of claim 5, wherein the connecting plate has a hole at a location corresponding to the short-circuit hole, and the connecting plate has a protrusion portion protruding from the exterior of the hole toward the first short-circuit plate and the second short-circuit plate.

7. The rechargeable battery of claim 6, wherein the round portion of the first short circuit plate makes contact with the protrusion portion when the internal pressure of the rechargeable battery reaches the preselected value.

8. The rechargeable battery of claim 5, further comprising a first insulation member between the cap plate and the connecting plate.

9. The rechargeable battery of claim 1, wherein a peripheral region of the first short-circuit plate and a peripheral region of the second short-circuit plate are welded to each other.

10. A rechargeable battery comprising:
an electrode assembly;
a case accommodating the electrode assembly;
a cap assembly sealing the case and comprising a cap plate; and
a short-circuit member comprising a first short-circuit plate coupled to the cap plate and a second short-circuit plate on a surface of the first short-circuit plate facing toward the electrode assembly and coupled to the cap plate,
wherein the first and second short-circuit plates are clad metals,
wherein the first short-circuit plate consists of aluminum and the second short-circuit plate consists of nickel,
wherein the second short-circuit plate comprises a coupling protrusion protruding toward and coupled to the first short-circuit plate, and
wherein the short-circuit member is configured to induce a short-circuit by inverting each of the second short-circuit plate and the first short-circuit plate together to be upwardly convex, the coupling protrusion remaining coupled to the first short-circuit plate.

* * * * *